June 6, 1967 M. J. McINTYRE 3,323,658
SKYLINE CARRIAGE
Filed Jan. 21, 1966
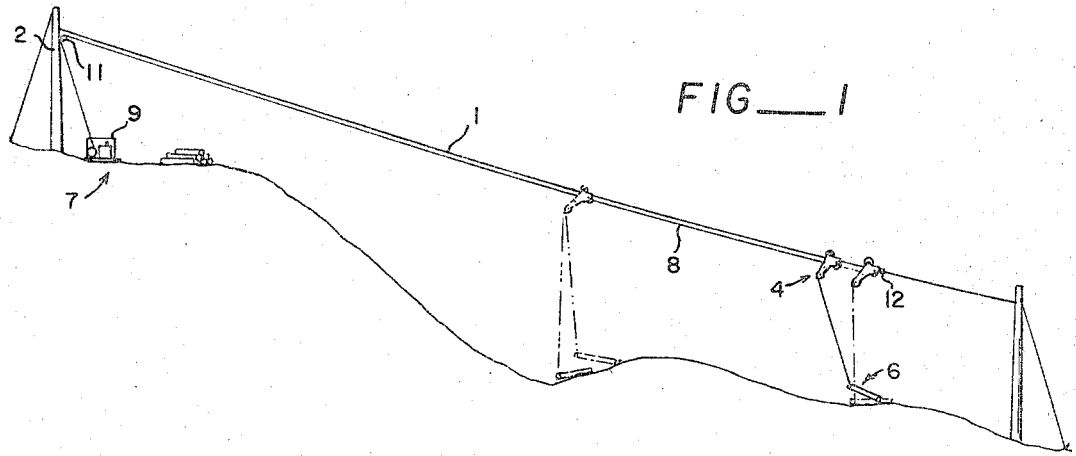
FIG. 1
FIG. 2
FIG. 3
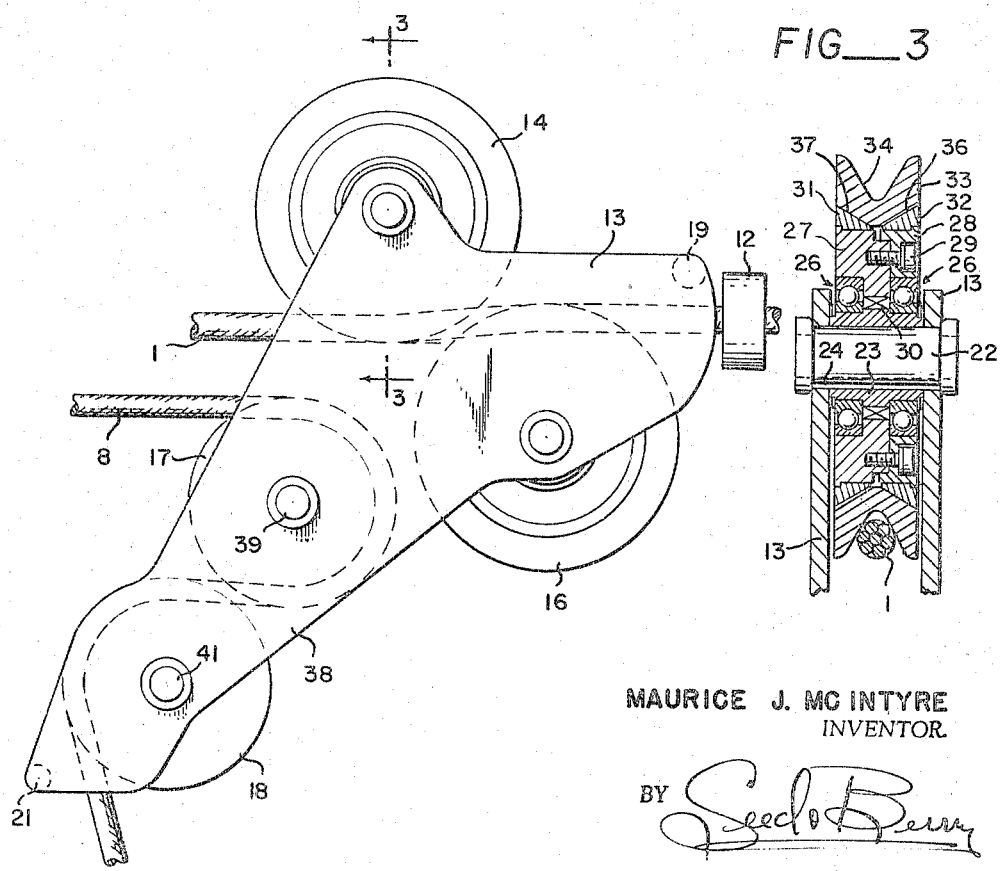
MAURICE J. McINTYRE
INVENTOR.
BY *Seed & Berry*
ATTORNEYS

United States Patent Office 3,323,658
Patented June 6, 1967

3,323,658
SKYLINE CARRIAGE
Maurice J. McIntyre, Sedro Woolley, Wash., assignor to The Humboldt Company, Seattle, Wash., a corporation of Washington
Filed Jan. 21, 1966, Ser. No. 522,080
12 Claims. (Cl. 212—92)

The present invention relates to a novel carriage assembly which is adapted to be mounted on and to be movable along the skyline cable of a log yarding system or other cable rigging used in lifting and transporting loads from one point to another.

More specifically, the present invention deals with a novel carriage assembly especially adapted for uphill transport of timber or other loads using what is conventionally known as a skyline system. The carriage assembly of the present invention allows the carriage to freely travel downhill to the loading point by action of gravity and provides for partial lifting of the load and return movement of the carriage along the skyline by use of a single drum wound load line. The load line passes through a novel sheaving arrangement on the carriage which effects a frictional locking of the carriage to the skyline until the load has been partially lifted and moved so as to release the frictional lock.

The object of the present invention is therefore, to provide a novel skyline carriage which is freely movable in one direction along the skyline and which is controlled for movement in the opposite direction by a single load line and the position of the load beneath the carriage.

Another object of the present invention is to provide a carriage of the character described which is freely movable in one direction along a skyline but which is braked against movement in the opposite direction when loaded until a sufficient force is exerted by the load line and the load and load line attain the proper position beneath the carriage which acts to release the carriage.

Another object of the present invention is to provide a carriage of the character described which is mounted on a skyline cable by wheel means which are freely rotatable in one direction but which are subject to a frictional drag of varying degree in the opposite direction depending upon the character of the load applied to the carriage.

A further object of the present invention is to provide a carriage assembly for use in a skyline system which provides for lifting a proportionate part of the weight of the turn of logs and wherein the logs will follow the contour of the ground as they are moved to the landing.

Further objects and advantages of the invention will be understood by those skilled in the art from the following specification and claims and from the accompanying drawings wherein:

FIG. 1 illustrates a typical skyline logging system utilizing the present carriage;

FIG. 2 is a side elevational view of the carriage assembly; and

FIG. 3 is a cross sectional view taken along lines 3—3 of FIG. 2.

Referring now to the drawings wherein like reference numerals indicate identical parts in the various views, FIG. 1 depicts a typical skyline logging setup wherein the skyline 1 is strung between a first tower 2 and a second tower or tree 3 located downhill. As will be understood by those familiar with the art, the skyline 1 is a fixed line and the load carrying carriage indicated generally at 4 is movable therealong for transporting the logs 6, for instance, uphill to the landing indicated generally at 7 where they may be stacked or loaded on a truck for transport. According to the present invention, a single load line 8 which may be hauled in or paid out by any conventional cable hauling means 9 extends through a fairlead or block 11 on the tower 2 and passes through the carriage assembly 4 in a manner presently to be described. The load line may be provided with conventional chokers for hooking up the turn of logs as will be understood by those skilled in the art. As previously explained, the carriage assembly 4 will be free wheeling in the downhill direction and a bumper block 12 of any known design will be fixed in position on the skyline 1 in order to halt the carriage at the approximate pickup area. The bumper device 12 will of course be capable of being fixed at selected positions along the skyline.

Referring now to FIGS. 2 and 3, the carriage assembly includes side plates 13, the two carriage wheels 14 and 16 which engage the skyline and support the carriage, and the two load line sheaves 17 and 18. The side plates 13 may be pinned together in any conventional manner such as by the cross pins 19 and 21 with conventional spacer means to form a carriage frame. The plates may be additionally held in position by the pivot pins or axles of the various wheels and sheaves.

Considering first of all the details of the carriage wheels, it will be understood that the wheels 14 and 16 may be substantially identical in structure or may be varied as desired. The cross section of one of the wheels 14 is shown in FIG. 3. Referring to FIG. 3, the carriage wheel comprises a cross pin 22 which passes through the plates 13 and is keyed to the plates and to a hub 23 by means of the key 24. The hub 23 is provided with conventional bearing assemblies 26 upon which is carried the demountable ring sections 27 and 28 held together by bolts or the like 29. For a purpose to be described, a one-way conventional sprag clutch or brake unit 30 is provided between the fixed hub 23 and the rotatable ring section 27. To complete the wheel structure, the bronze rings 31 and 32 are mounted on the rings 27 and 28 and are held in place by the annular flanges on the rings so as to form a conical bushing. An annular cable contacting ring 33 is mounted on the conical bushing and is formed with a groove 34 for contacting the skyline cable 1 and has conical surfaces 36 and 37 for frictionally engaging the surfaces of the bronze bushing. The one-way sprag clutch 31 will be installed so as to allow the wheels 14 and 16 to rotate freely when the carriage is moving in the downhill direction on the skyline 1 but will prevent rotation of the rings 27 and 28 and the bronze rings 31 and 32 with relation to the fixed hub 23 when the carriage moves in the uphill direction. The only connection between the grooved ring 34 and the bushings 32 is that of a frictional contact and thus in order to move the carriage uphill, it is necessary to overcome the friction between the ring and the bronze bushing. It will of course be obvious that the greater the pressure between the cable 1 and the grooved ring 34, the greater the force which is required to overcome the fractional contact between the ring and the bushing.

As will be noted from FIG. 2, the axes of the carriage wheels 14 and 16 are offset in the longitudinal direction of the cable 1. The load line sheaves 17 and 18 which define a carrying means for the load line may comprise conventional sheaves and are mounted between the extended arms 38 of the plates 13. In the preferred embodiment illustrated, the extended arms 38 reach downwardly and forwardly, i.e. in an uphill direction, from the body of the plates and the axes of the sheaves 17 and 18 are vertically spaced and offset from the axes of the wheels 14 and 16. In addition, the axes 38 and 41 of the sheaves 17 and 18 may be offset in longitudinal direction of the cable 1 with the lower sheave 18 having its axis forward of the axis of the sheave 17. As seen in FIG. 2, the skyline passes between the two carriage wheels 14 and 16 and the load line 8 passes about the sheave 17 and then forwardly and about the sheave 18 and from thence downwardly to the load. As will be obvious, when a load is hooked to the lower end of the line 8 and a pull is exerted by the drum 9, a turning moment results because of the vertical offset of the sheaves 17 and 18 and the manner in which the load line passes thereabout. The turning moment tends to rotate the entire carriage assembly in the counter clockwise direction as viewed in FIG. 2 so as to increase the frictional contact between the rings 34 and the bronze bushings of the wheels 14 and 16 because of the longitudinal offset of the wheels. Since the carriage will always be located above the load, the resultant force on the carriage will always have a vertical as well as a horizontal component acting to rotate the carriage assembly. It will also be observed that the greater the horizontal component, the greater the turning moment and hence the greater the friction between the rings 34 and the bronze bushings of the carriage wheels. As the direction of the resultant force, represented by the load line beneath the carriage, moves toward the vertical direction, the less the friction at the carriage wheels. By controlling the co-efficient of friction between the rings 34 and the bronze bushings of the carriage wheels, and by determining the appropriate weight of the load to be lifted, an angle may be chosen for the downwardly extending load line between the carriage and the load at which the pull on the load line 8 will overcome the frictional drag at the carriage wheels in order to cause the carriage to move uphill to the landing. In practice it has been found that designing the system with a carrying angle of 15° between the load line 8 and the vertical will serve to lift approximately 50 to 70% of an average turn of logs which may be in the neighborhood of twenty thousand pounds. Thus any time that the angle between the load lines 8 and the vertical is greater than 15° the carriage will not move because of the increased frictional drag on the carriage wheels due to the increased horizontal component of force acting to rotate the carriage. Since the carriage does not move, the load line 8 may be hauled in to lift approximately 50 to 70% of the weight of the turn of logs and to move the logs until the angle of the load line becomes approximately 15° with the vertical. As the load line approaches the optimum 15° angle, the frictional drag on the carriage wheels will diminish until the carriage starts to move uphill. At any time during movement of the turn of logs that the angle of the load line with the vertical becomes greater than 15°, the carriage will come to a halt and the logs will again be moved and lifted until the 15° angle is obtained. Likewise if the logs fall ahead of the carriage, which might be the case in the event the moving logs passed over a rise as illustrated in dotted line in FIG. 1, the logs would merely fall and come to a halt and the carriage would move ahead of the logs until the 15° angle of the load line were attained and the carriage would begin to halt as the load line again started to lift the logs so as to maintain the 15° angle. Thus the logs are caused to follow the contour of the terrain between the pickup point and the landing. This action is depicted schematically in FIG. 1.

In utilizing the carriage assembly in a typical setup as shown in FIG. 1, the carriage will first be allowed to descend on the skyline 1 by freely paying out the load line 8. The sprag clutch or brake 30 will allow the carriage to travel freely downhill to the bumper 12 where it will be halted above the loading point for picking up the logs 6. After the chokers are set on the logs 6, the load line is hauled in until it becomes taut. It will be noted at this time that the angle of the load line between the carriage and the load is substantially greater than 15° with the vertical. As the load line continues to be hauled in, the turning moment will be exerted on the carriage so as to increase the frictional drag on the carriage wheels thus preventing any substantial movement of the carriage uphill along the skyline. As a result, the logs are partially raised and moved toward the carriage until the angle of the load line approaches the 15° optimum. When this occurs, the carriage begins to move because of the lessening of the frictional drag on the carriage wheels. In this manner the logs continue in their uphill direction and are halted at the landing and the cycle is repeated.

It will be understood, of course, that the 15° load line angle is given by way of illustration and not limitation and that the optimum angle may be changed by design without departing from the scope of the present invention.

It is believed that the invention will have been clearly understood from the foregoing detailed description of the illustrated preferred embodiment. Minor changes in the details of construction will suggest themselves and may be resorted to without departing from the spirit of the invention. Accordingly it is intended that no limitations be implied and that the hereto annexed claims be given a scope fully commensurate with the broadest interpretation to which the employed language fairly admits.

Having thus described the invention, what is new and desired to be secured by Letters Patent is:

1. In combination; a carriage frame, first and second carriage wheels on said frame and adapted to engage opposite sides of a support cable, means on at least one of said wheels providing a frictional drag against rotation of said one wheel in one direction of movement only of said carriage, line carrying means on said frame adapted to receive a load line, said carrying means being so positioned as to produce a turning moment on said frame when tension is placed on the load line, so that said frictional drag is increased as the force of said turning moment is increased.

2. The combination according to claim 1 including; a fixed support cable passing between said wheels, said wheels being in rolling engagement with said support cable, a load line passing through said line carrying means and adapted to be connected to a load beneath said carriage, means to apply a pulling force on said load line for lifting a load and moving said carriage in said one direction, said load line producing a maximum turning moment on the carriage when disposed in a horizontal direction and a minimum turning moment when disposed in a vertical direction, whereby said load line will be maintained at a maximum angle with respect to vertical at which the pulling force overcomes the frictional drag on said one wheel.

3. The combination according to claim 1 wherein; said one wheel comprises axle means fixed to said frame, first ring means mounted for rotation on said axle, cable contacting ring means mounted for rotation on said first ring means, said means providing a frictional drag including, one-way brake means mounted between said axle and said first ring to lock said first ring against rotation in said one direction of movement of said carriage, and a friction bushing between said first ring and said cable contacting ring to maintain a frictional drag against relative rotation therebetween.

4. The combination according to claim 1 wherein; both of said wheels include means providing a frictional drag against rotation thereof in said one direction of movement only of said carriage.

5. The combination according to claim 4 wherein; each wheel comprises axle means fixed to said frame, first ring means mounted for rotation on said axle, cable contacting ring means mounted for rotation on said first ring means, said means providing a frictional drag including, one-way brake means mounted between said axle and said first ring to lock said first ring against rotation in said one direction of movement of said carriage, and a friction bushing between said first ring and said cable contacting ring to maintain a frictional drag against relative rotation therebetween.

6. The combination according to claim 1 wherein said line carrying means comprises; first and second sheaves, said sheaves being mounted in spaced relation on said frame and located in the same general plane as said wheels, said sheaves being adapted to receive said load line passed in reverse direction thereabout to produce a turning moment on said frame upon tensioning of said load line.

7. The combination according to claim 6 wherein; the axes of said carriage wheels are offset longitudinally along the axis of the support cable, the axes of said sheaves being offset in a direction transverse to the axis of the support cable.

8. The combination according to claim 7 wherein; the axes of said sheaves are additionally offset longitudinally with respect to the axis of said cable.

9. The combination according to claim 2 wherein said line carrying means comprises; first and second sheaves, said sheaves being mounted in spaced relation on said frame and located in the same general plane as said wheels, said load line being reversely directed about said sheaves.

10. The combination according to claim 9 wherein; the axes of said carriage wheels are offset longitudinally along the axis of the support cable, the axes of said sheaves being offset in a direction transverse to the axis of the support cable.

11. The combination according to claim 10 wherein the axes of said sheaves are additionally offset longitudinally with respect to the axis of said cable.

12. In combination; a support cable, a load hauling line, a carriage mounted for free movement in one direction along said cable, said line passing freely through said carriage, and means on said carriage responsive to hauling in of said line when loaded to induce a frictional drag against movement of the carriage in the other direction.

References Cited

UNITED STATES PATENTS

| | | | |
|---|---|---|---|
| 795,730 | 7/1905 | Parry et al. | 212—92 |
| 2,649,209 | 8/1953 | Wilson | 212—92 |
| 3,058,601 | 10/1962 | Wyssen | 212—92 |
| 3,083,839 | 4/1963 | McIntyre | 212—87 |

ANDRES H. NIELSEN, *Primary Examiner.*